Nov. 8, 1932.  G. STEELE ET AL  1,887,070
FLEXIBLE SHAFT COUPLING
Filed July 30, 1931
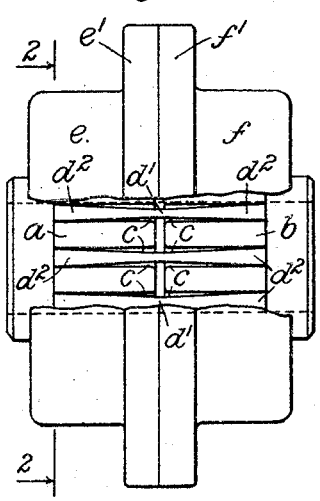
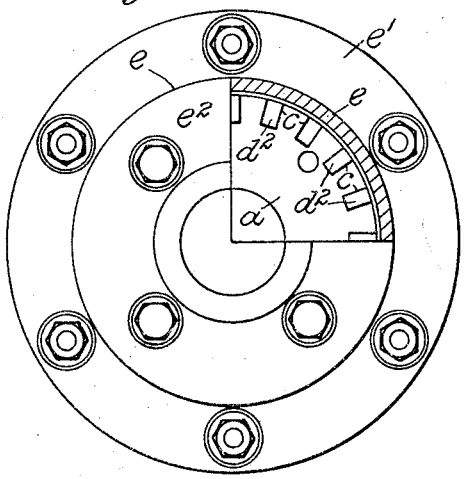
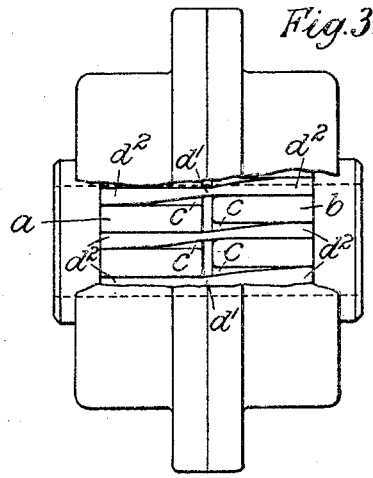
Inventors
G. STEELE
S. D. COWLISHAW
J. B. CAPEY
By Ruege & Boyce
Attorneys Patented Nov. 8, 1932

1,887,070

UNITED STATES PATENT OFFICE

GEORGE STEELE, SKEVINGTON DICKINSON COWLISHAW, AND JOHN BUCKLEY CAPEY, OF HANLEY, STOKE-ON-TRENT, ENGLAND

FLEXIBLE SHAFT COUPLING

Application filed July 30, 1931, Serial No. 553,974, and in Great Britain August 8, 1930.

This invention relates to flexible shaft couplings of the kind which comprise two coupling discs mounted respectively one on each of the opposed ends of two approximately aligned shafts to be intercoupled, and each formed around the periphery with a plurality of notches or grooves extending parallel with the axes of the shafts and interconnected by normally straight spring blades located in and extending between and at their ends substantially fitting the notches or grooves of the two discs.

It has already been proposed to render the flexibility of the interconnecting blades automatically dependent upon the transmitted torque, by outwardly parabolically or otherwise laterally flaring the notches or grooves so that the unsupported span of the blades decreases with an increase of their flexure.

Now, according to the present invention, a similar effect is obtained by having the notches or grooves in the coupling discs straight sided and of uniform width throughout their effective length, and forming the spring blades with sides converging towards their mid-lengths from their ends or butts which substantially fit the rear ends of the notches or grooves.

The tapering of the blades is preferably such as to impart a parabolic concave curvature to the profile thereof at their mid-length.

The tapered portions of the blades within the notches or grooves progressively contact with the parallel straight sides of the latter with increase of flexure of the blades on increase of transmitted torque.

The sides of the grooves are preferably truly parallel that is to say the sides preferably do not converge in the radial direction, although they may so converge if blades of corresponding tapering cross-section are employed.

A coupling according to the invention is illustrated, by way of example, on the accompanying drawing, in which:—

Fig. 1 is a side elevation of the coupling, with part of the casing broken away, showing the spring blades unflexed, and Fig. 2 is a corresponding elevation partly in section along the line 2—2 of Fig. 1.

Fig. 3 is a side elevation similar to Fig. 1, but with the spring blades greatly flexed as they would be under severe accidental loads.

$a$ and $b$ are two coupling discs or muffs adapted to be mounted and keyed respectively one on each of the opposed ends of two approximately aligned shafts to be intercoupled.

Each disc or muff $a, b$ is formed around its periphery with a plurality of notches or grooves $c$ extending parallel with the axes of the discs or muffs $a, b$. The notches or grooves $c$ are straight sided and of uniform width throughout their length. Also, in the illustrated example as shown in Fig. 2, the sides of the notches or grooves $c$ are parallel, in the sense as set forth above.

$d^1$ $d^2$ are normally straight spring blades located in and extending between the notches or grooves $c$ of the two discs or muffs $a, b$. The sides of these spring blades $d^1$ $d^2$ converge towards their mid-lengths $d^1$ from their ends or butts $d^2$ which substantially fit the mutually remote ends of the notches or grooves $c$.

The tapering of the blades $d^1$ $d^2$ due to the above stated convergence is, in the illustrated example, such as to impart parabolic curvatures to the sides of the blades.

The discs or muffs $a, b$ and the blades $d^1$ $d^2$ are enclosed in a housing, consisting of a cylindrical casing $e$, bolted by an inwardly directed flange $e^2$ to the rear or outer end face of the disc or muff $a$ and by an outwardly directed flange $e^1$ at the other end, to an outwardly directed flange $f^1$ at one end of another casing $f$, overhanging but not bolted to the other disc or muff $b$.

When transmitting a torque the blades $d^1$ $d^2$ normally are flexed to a curvature intermediate between the conditions shown in Figs. 1 and 3, depending upon the load.

We claim:

1. In a flexible shaft coupling, a pair of mutually opposed discs formed with axially extending straight sided grooves of uniform width throughout the effective length of said grooves, and spring blades substantially fitting said grooves by the ends of said blades and having sides converging from said ends towards the mid-lengths of said blades.

2. In a flexible shaft coupling, a pair of mutually opposed discs formed with axially extending straight sided grooves of uniform width throughout the effective length of said grooves, and spring blades substantially fitting said grooves by the ends of said blades and having sides of parabolic profile converging from said ends towards the mid-lengths of said blades.

3. In a flexible shaft coupling, a pair of mutually opposed discs formed with axially extending parallel sided grooves, and spring blades substantially fitting said grooves by the ends of said blades and having sides converging from said ends towards the mid-lengths of said blades.

4. In a flexible shaft coupling, a pair of mutually opposed discs formed with axially extending parallel sided grooves, and spring blades substantially fitting said grooves by the ends of said blades and having sides of parabolic profile converging from said ends towards the mid-lengths of said blades.

5. In a flexible shaft coupling, a pair of mutually opposed discs formed with axially extending parallel sided grooves, spring blades substantially fitting said grooves by the ends of said blades and having sides converging from said ends towards the mid-lengths of said blades, a cylindrical casing enclosing one of said discs, an inwardly directed flange on said casing bolted to said disc, an outwardly directed flange on said casing, a second cylindrical casing enclosing the other of said discs, and an outwardly directed flange on said second-mentioned casing bolted to said outwardly directed flange on said first-mentioned casing.

6. In a flexible shaft coupling, a pair of mutually opposed discs formed with axially extending parallel sided grooves, spring blades substantially fitting said grooves by the ends of said blades and having sides of parabolic profile converging from said ends towards the mid-lengths of said blades, a cylindrical casing enclosing one of said discs, an inwardly directed flange on said casing bolted to said disc, an outwardly directed flange on said casing, a second cylindrical casing enclosing the other of said discs, and an outwardly directed flange on said second-mentioned casing bolted to said outwardly directed flange on said first-mentioned casing.

In testimony whereof we have signed our names to this specification.

GEORGE STEELE.
SKEVINGTON DICKINSON COWLISHAW.
JOHN BUCKLEY CAPEY.